United States Patent
Lin et al.

(10) Patent No.: US 8,278,857 B2
(45) Date of Patent: Oct. 2, 2012

(54) MOTOR CONTROL DEVICE AND CONTROLLER THEREOF

(75) Inventors: Yu-Liang Lin, Taoyuan Hsien (TW); Ming-Yen Lin, Taoyuan Hsien (TW); Chia-Wen Kuo, Taoyuan Hsien (TW); Kuan-Ting Lee, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 447 days.

(21) Appl. No.: 12/578,835

(22) Filed: Oct. 14, 2009

(65) Prior Publication Data

US 2010/0270959 A1    Oct. 28, 2010

(30) Foreign Application Priority Data

Apr. 22, 2009   (TW) ................................. 98113269 A

(51) Int. Cl.
*H02P 6/14* (2006.01)
(52) U.S. Cl. .............. 318/400.28; 318/400.29; 318/810; 318/804; 318/280; 318/80; 315/128; 315/246; 315/279; 310/216; 310/16; 363/17; 363/21.02; 363/21.09; 363/49; 363/23.11
(58) Field of Classification Search ............ 318/400.29, 318/80, 280, 810, 590, 804; 315/128, 246, 315/279; 310/216.016; 363/17, 21.02, 21.06, 363/21.09, 49, 23.11
See application file for complete search history.

(56) References Cited

U.S. PATENT DOCUMENTS

| | | | | |
|---|---|---|---|---|
| 5,032,774 A * | 7/1991 | Juzswik | ........................ | 318/293 |
| 6,262,554 B1 * | 7/2001 | Kojima et al. | ................ | 318/685 |
| 2006/0197481 A1 * | 9/2006 | Hotto et al. | .................... | 318/280 |
| 2007/0297205 A1 * | 12/2007 | Chen et al. | ..................... | 363/132 |
| 2009/0224709 A1 * | 9/2009 | Jeung | ....................... | 318/400.13 |
| 2009/0261764 A1 * | 10/2009 | Hirata | ..................... | 318/400.29 |
| 2009/0295776 A1 * | 12/2009 | Yu et al. | ........................ | 345/212 |
| 2010/0002744 A1 * | 1/2010 | Sheahan | ........................... | 374/1 |

* cited by examiner

*Primary Examiner* — Walter Benson
*Assistant Examiner* — Jorge Carrasquillo
(74) *Attorney, Agent, or Firm* — Muncy, Geissler, Olds & Lowe, PLLC

(57) ABSTRACT

A motor control device is electrically connected with a motor. The motor control device includes a controller and a driving circuit. The controller has a default value of time and generates a first driving signal and a second driving signal. The driving circuit includes a first switching element and a second switching element, the first switching element and the second switching element receive the first driving signal and the second driving signal respectively, and the first switching element and the second switching element are switched on or switched off alternately according to the first driving signal and the second driving signal respectively, so as to drive the motor to operate. The controller switches off the first switching element by the first driving signal the default value of time before the controller switches on the second switching element by the second driving signal, and the controller switches off the second switching element by the second driving signal the default value of time before the controller switches on the first switching element by the first driving signal.

13 Claims, 8 Drawing Sheets

MOTOR CONTROL DEVICE AND CONTROLLER THEREOF

CROSS REFERENCE TO RELATED APPLICATIONS

This Non-provisional application claims priority under 35 U.S.C. §119(a) on Patent Application No(s). 098113269, filed in Taiwan, Republic of China on Apr. 22, 2009, the entire contents of which are hereby incorporated by reference.

BACKGROUND OF THE INVENTION

1. Field of Invention

The present invention relates to a motor control device and the controller thereof that the two sets of switching elements in the motor control device will not be switched on at the same time, so as to prevent form damaging the electronic components of the internal circuit of the motor.

2. Related Art

Please refer to FIG. 1, which shows a conventional motor control device. The conventional motor control device is mainly composed of a hall element 11 and a driving circuit 12 (such as a full-bridge circuit). The hall element 11 detects the magnetic poles of the motor when the motor operates and generates a magnetic pole detecting signal, and then the hall element 11 generates two driving signals (S1, S2) according to the magnetic pole detecting signal and outputs the two driving signals (S1, S2) to the four switches (SW1-SW4) (such as transistor) of the driving circuit 12 respectively. Specifically, the driving signal 51 is outputted to the switch (SW1) and the switch (SW4), and the driving signal S2 is outputted to the switch (SW2) and the switch (SW3), so as to switch on or switch off the switches (SW1, SW4) or the switches (SW2, SW3) alternately by the two driving signals (S1, S2) and interchange the direction of the current flowing through the coil 20 of the motor, and also drive the motor to operate.

Please both refer to FIG. 1 and FIG. 2, although the motor can be driven by the way described above, but the four switches (SW1-SW4) may be switched on simultaneously by the two driving signals (S1, S2) at the time that the switches (SW1, SW4) are switched on and the switches (SW2, SW3) are switched off or at the time that the switches (SW1, SW4) are switched off and the switches (SW2, SW3) are switched on, so that the current (I) of the power source may flow to the ground through the switch (SW1) and the switch (SW3), or the current (I) of the power source may flow to the ground through the switch (SW2) and the switch (SW4), this means the current (I) flowing through the switch (SW1) and the switch (SW3) or through the switch (SW2) and the switch (SW4) is much greater because the current (I) dose not pass through the coil 20 of the motor (i.e., the resistance which the current (I) flowing through is much lower), and this will burn down the switches (SW1-SW4) and make the motor stop operating.

SUMMARY OF THE INVENTION

One objective of the present invention is to provide a motor control device, which is electrically connected with a motor. The motor control device includes a controller and a driving circuit. The controller has a default value of time and outputs a first driving signal and a second driving signal. The driving circuit includes a first switching element and a second switching element, the first switching element and the second switching element receives the first driving signal and the second driving signal, and the first switching element and the second switching element are switched on or switched off alternately according to the first driving signal and the second driving signal respectively, so as to drive the motor to operate. The controller switches off the first switching element by the first driving signal the default value of time before the controller switches on the second switching element by the second driving signal, and the controller switches off the second switching element by the second first driving signal the default value of time before the controller switches on the first switching element by the first driving signal, so that the first switching element and the second switching element will not be switched on at the same time, and the current can pass through the coil of the motor smoothly, i.e., the first switching element and the second switching element will not be burnt down.

Another objective of the present invention is to provide a controller, which is electrically connected with a driving circuit of the motor control device, and the driving circuit is electrically connected with a motor. The controller includes a detecting unit and a signal controlling unit. The detecting unit detects the magnetic poles of the motor when the motor operates and outputs a magnetic pole detecting signal to the signal controlling unit. The signal controlling unit receives the magnetic pole detecting signal, so as to generate the first driving signal and the second driving signal according to the magnetic pole detecting signal and output the first driving signal and the second driving signal to the first switching element and the second switching element of the driving circuit respectively, and to switch on or switch off the first switching element and the second switching element of the driving circuit alternately, i.e., to interchange the direction of the current flowing through the coil of the motor and to drive the motor to operate. Moreover, the detecting unit (such as a hall element) controls the driving circuit by only two pins, so that the circuit is simplified and the cost is reduced.

BRIEF DESCRIPTION OF THE DRAWINGS

The present invention will be fully understood from the subsequent detailed description and accompanying drawings, which are given by way of illustration only, and thus are not limitative of the present invention, and wherein.

DETAILED DESCRIPTION OF THE INVENTION

The preferred embodiments of a motor control device and the controller thereof of the present invention will be apparent from the following detailed description, which proceeds with reference to the accompanying drawings.

Figure 1:
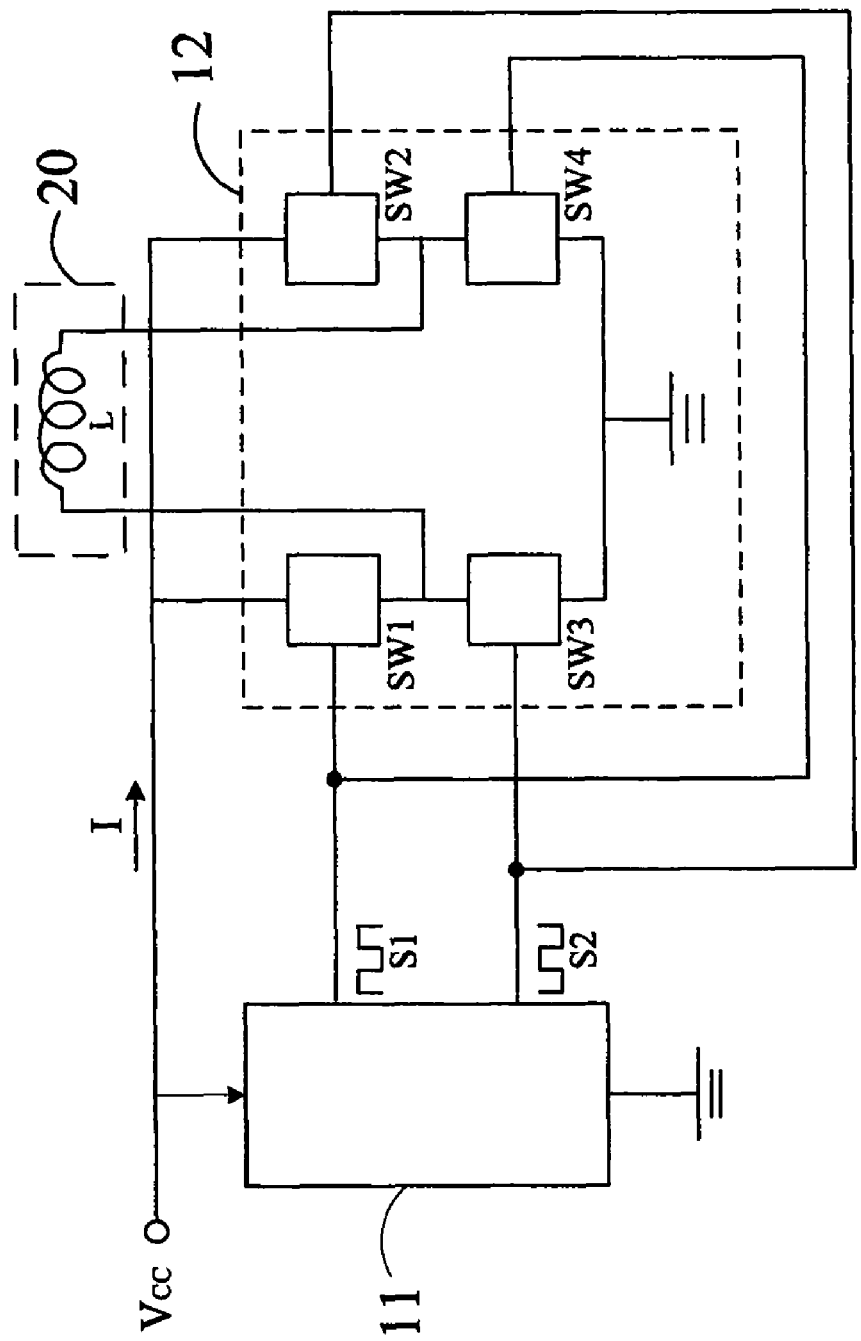
FIG. 1 is a schematic circuit diagram of a conventional motor control device.
Figure 2:
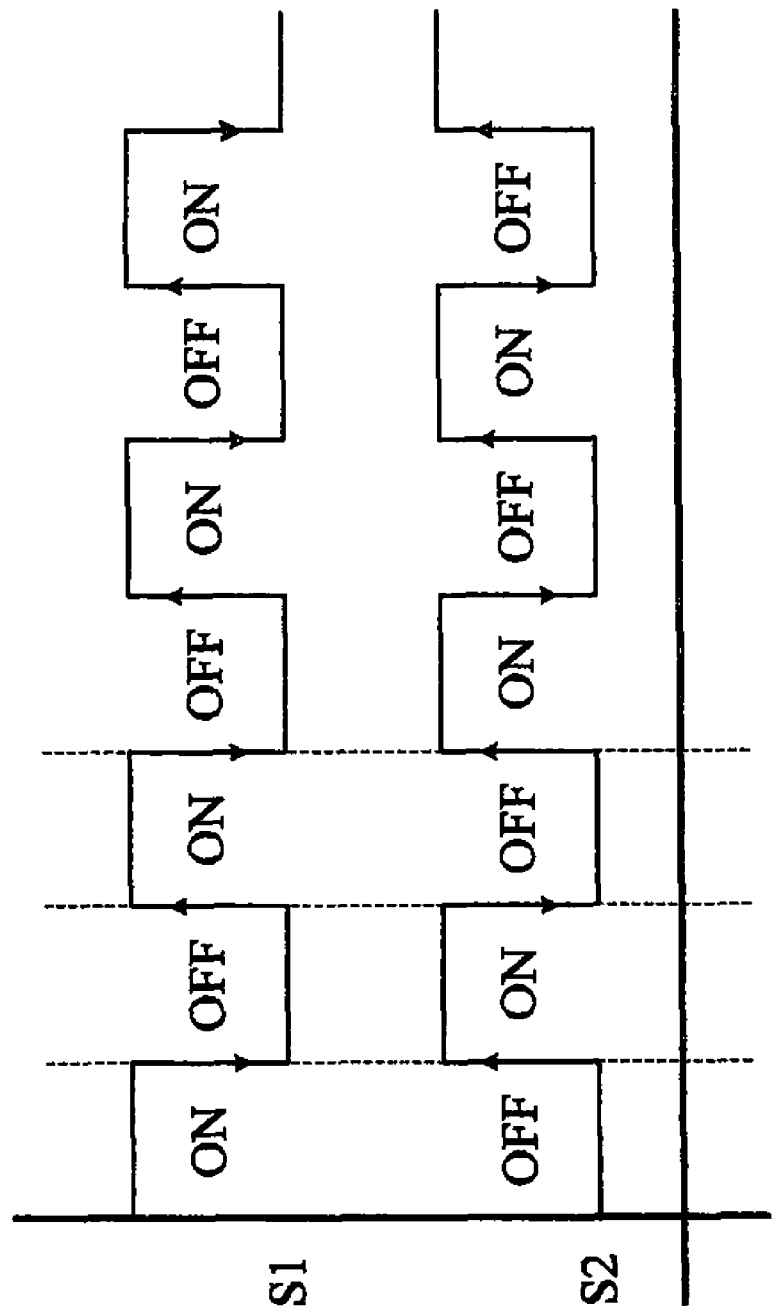
FIG. 2 is a schematic diagram showing the wave of driving signals of the conventional motor control device of FIG. 1.
Figure 3:
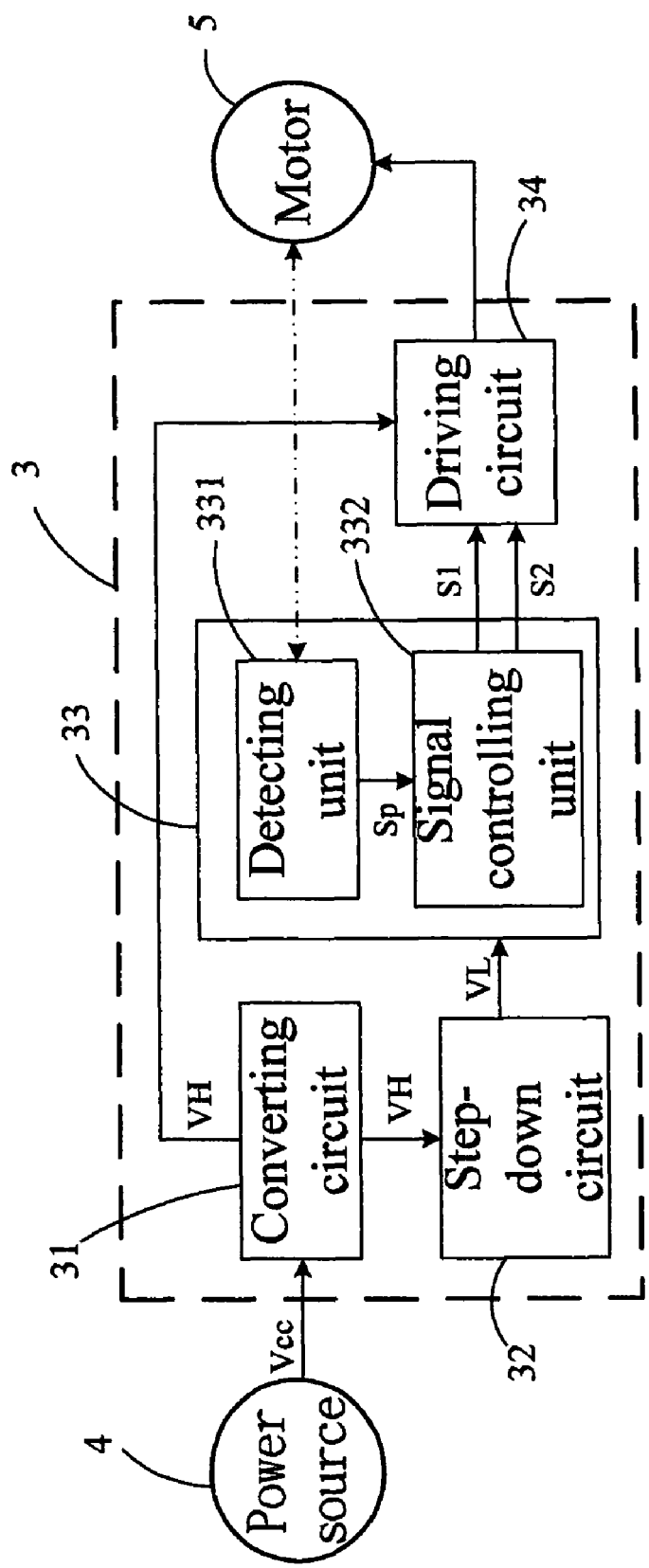
FIG. 3 is a circuit block diagram of a motor control device according to a first embodiment of the present invention.
Figure 4:
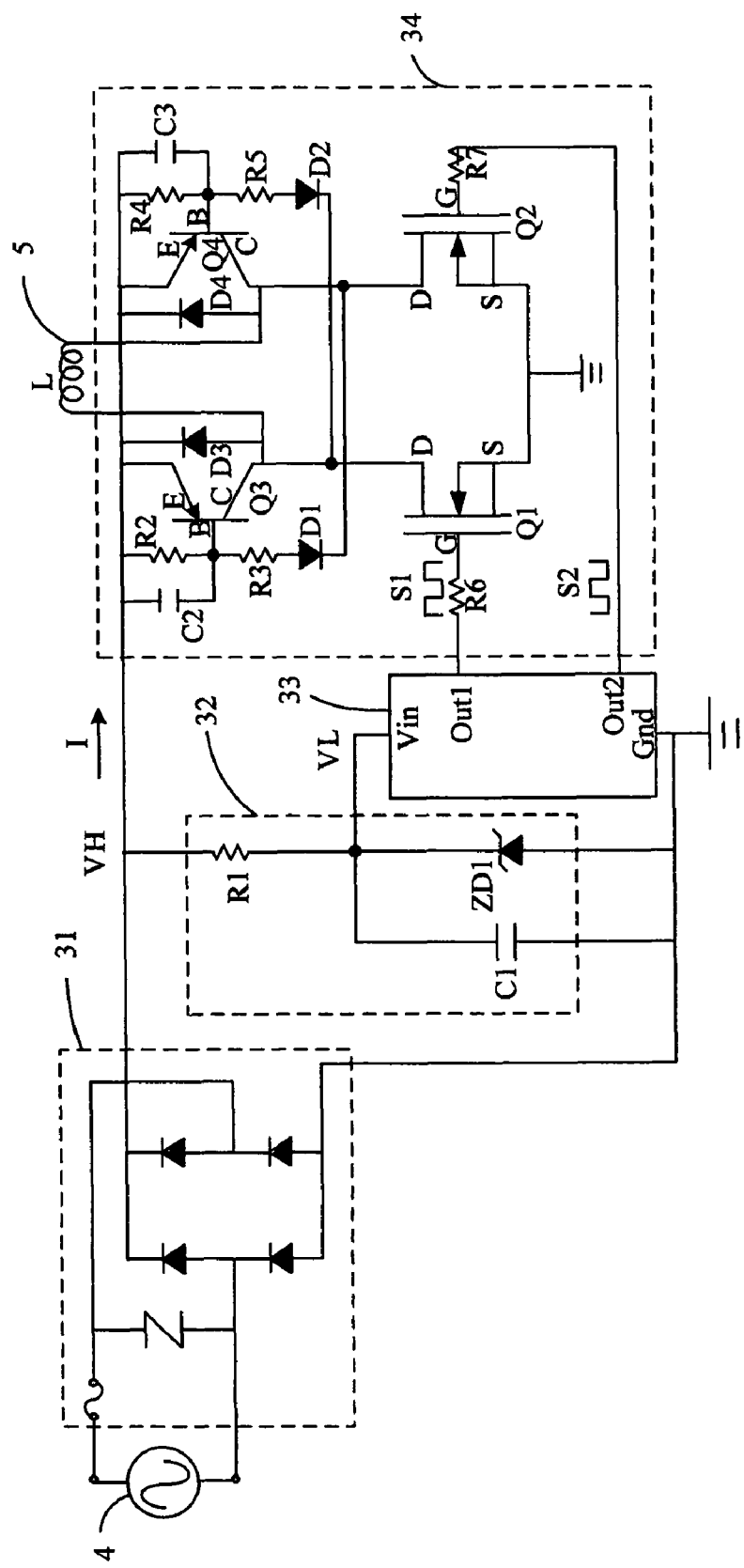
FIG. 4 is a schematic circuit diagram of the motor control device according to the first embodiment of the present invention.

Please both refer to FIG. 3 and FIG. 4, the motor control device 3 according to a first embodiment of the present invention is electrically connected with an alternating current (AC) power source 4 and a motor 5 respectively. The motor control device 3 includes a converting circuit 31, a step-down circuit 32, a controller 33 and a driving circuit 34.

The converting circuit 31 is a converter for example. The input terminal of the converting circuit 31 is electrically connected with the alternating current power source 4. The output terminal of the converting circuit 31 is electrically connected with the step-down circuit 32 and the driving circuit 34 (or the motor 5) respectively. The converting circuit 31 converts the voltage of the alternating current power source 4 to be a voltage of direct current of high potential (VH) and outputs the voltage of direct current of high potential (VH) to the step-down circuit 32 and the driving circuit 34 (i.e. the motor 5).

The step-down circuit 32 is electrically connected with the output terminal of the converting circuit 31 and the controller 33 respectively. Because the controller 33 can be driven just by low voltage of direct current, the step-down circuit 32 steps down the voltage of direct current of high potential (VH) to be a voltage of direct current of low potential (VL) and outputs the voltage of direct current of low potential (VL) to the controller 33 for driving the controller 33. The step-down circuit 32 mentioned above includes a resistor (R1), a Zener diode (Zd1) and a capacitor (C1).

The controller 33 is a motor driving IC for example. In this embodiment, the controller 33 has a first pin (Out 1), a second pin (Out 2), a third pin (Vin) and a fourth pin (Gnd). The first pin (Out 1) is electrically connected with a first switching element (Q1) of the driving circuit 34, so as to output a first driving signal (S1) to the first switching element (Q1). The second pin (Out 2) is electrically connected with a second switching element (Q2) of the driving circuit 34, so as to output a second driving signal (S2) to the second switching element (Q2). The third pin (Vin) is electrically connected with the output terminal of the step-down circuit 32, so as to receive the voltage of direct current of low potential (VL) outputted by the step-down circuit 32. The fourth pin (Gnd) is electrically connected with a ground. The controller 33 includes a detecting unit 331 and a signal controlling unit 332. The detecting unit 331 is a hall element for example. The detecting unit 331 detects the magnetic poles of the motor 5 when the motor 5 operates, so as to generate a magnetic pole detecting signal (Sp). The signal controlling unit 332 has a default value of time (6-8 μSec for example). The signal controlling unit 332 receives the magnetic pole detecting signal (Sp), so as to generate the first driving signal (S1) and the second driving signal (S2) according to the magnetic pole detecting signal (Sp) and output the first driving signal (S1) and the second driving signal (S2) to the driving circuit 34. Both of the first driving signal (S1) and the second driving signal (S2) are a pulse-width modulation signal of alternate high potential and low potential, and the first driving signal (S1) and the second driving signal (S2) will not be at high potential at the same time.

The driving circuit 34 is a full-bridge circuit for example. The full-bridge circuit (driving circuit 34) includes a lower bridge and an upper bridge. The lower bridge of the driving circuit 34 is composed of the first switching element (Q1) and the second switching element (Q2). The upper bridge of the driving circuit 34 is composed of the third switching element (Q3) and the fourth switching element (Q4). The said switching elements are electrically connected between the coil (L) of the motor 5 and the controller 33, and the third switching element (Q3) and the fourth switching element (Q4) of the upper bridge are a bipolar junction transistor respectively for example, and the first switching element (Q1) and the second switching element (Q2) of the lower bridge are a metal-oxide-semiconductor field-effect transistor respectively for example.

The collect (C) of the third switching element (Q3) and the collect (C) of the fourth switching element (Q4) are electrically connected with the two ends of the coil (L) of the motor 5 respectively. The emitter (E) of the third switching element (Q3) and the emitter (E) of the fourth switching element (Q4) are electrically connected with the output terminal of the converting circuit 31 respectively. The base (B) of the third switching element (Q3) is electrically connected with the second end of a capacitor (C2), the second end of a resistor (R2) and the first end of a resistor (R3), respectively. The first end of the capacitor (C2) and the first end of the resistor (R2) are electrically connected with the output terminal of the converting circuit 31. The second end of the resistor (R3) is electrically connected with the anode of a diode (D1), and the cathode of the diode (D1) is electrically connected with the collect (C) of the fourth switching element (Q4). The base (B) of the fourth switching element (Q4) is electrically connected with the second end of a capacitor (C3), the second end of a resistor (R4) and the first end of a resistor (R5). The first end of the capacitor (C3) and the first end of the resistor (R4) are electrically connected with the output terminal of the converting circuit 31. The second of the resistor (R5) is electrically connected with the anode of a diode (D2), and the cathode of the diode (D2) is electrically connected with the collect (C) of the third switching element (Q3). The cathode of a diode (D3) and the cathode of a diode (D4) are electrically connected with the output terminal of the converting circuit 31, respectively, and the anode of the diode (D3) and the anode of the diode (D4) are electrically connected with the two ends of the coil (L), respectively.

The drain electrode (D) of the first switching element (Q1) and the drain electrode (D) of the second switching element (Q2) are electrically connected with the two ends of the coil (L) of the motor 5 respectively, and the drain electrode (D) of the first switching element (Q1) is electrically connected with the collect (C) of the third switching element (Q3), and the drain electrode (D) of the second switching element (Q2) is electrically connected with the collect (C) of the fourth switching element (Q4). The gate electrode (G) of the first switching element (Q1) is electrically connected with the first pin (Out 1) of the controller 33 (driving IC), and the gate electrode (G) of the second switching element (Q2) is electrically connected with the second pin (Out 2) of the controller 33 (driving IC). The source electrode (S) of the first switching element (Q1) and the source electrode (S) of the second switching element (Q2) are electrically connected with the ground.

Figure 5:
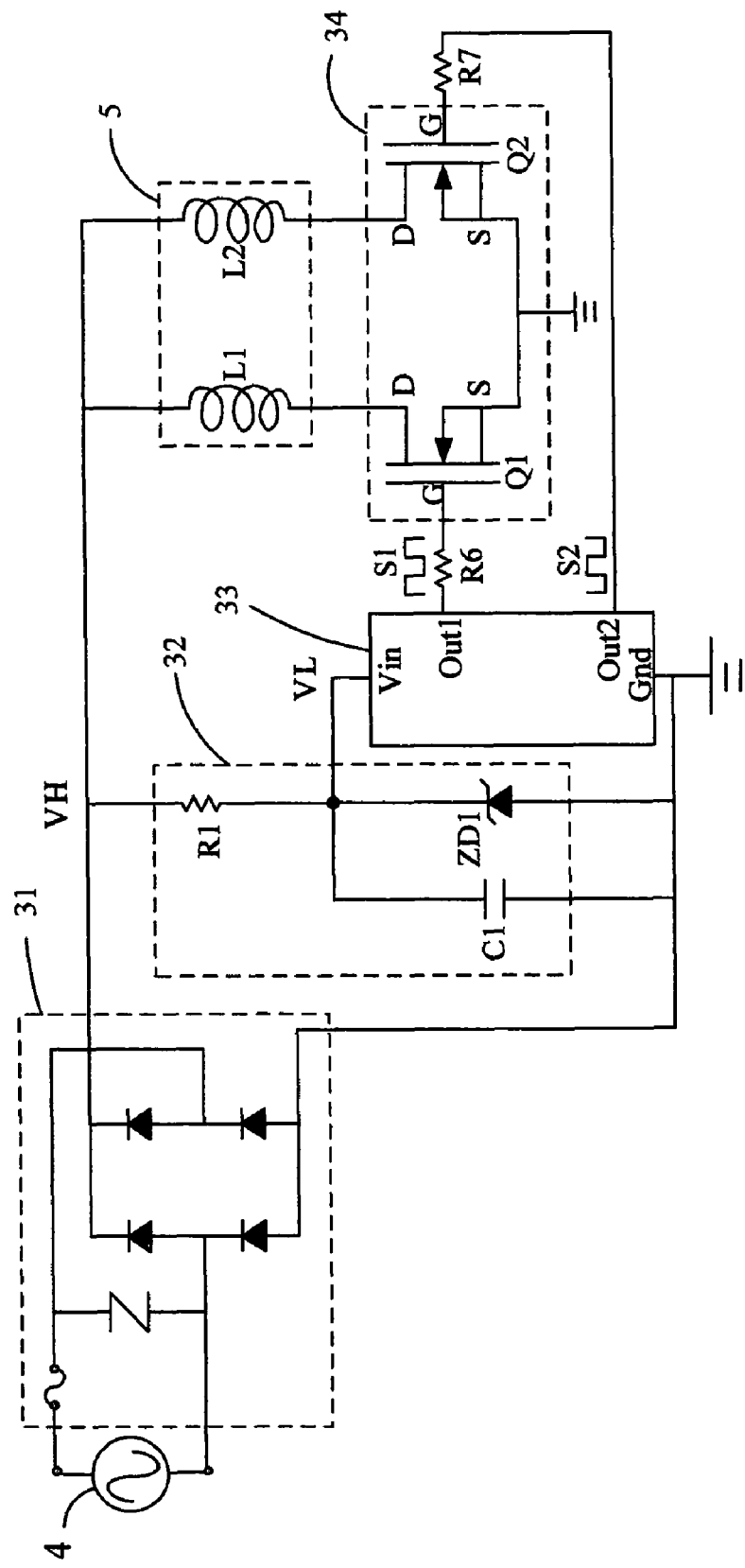
FIG. 5 is another schematic circuit diagram of the motor control device according to the first embodiment of the present invention.

Please refer to FIG. 5, the driving circuit 34 can also be a half-bridge circuit for example. The half-bridge circuit (driving circuit 34) includes the first switching element (Q1) and the second switching element (Q2). The first switching element (Q1) and the second switching element (Q2) are electrically connected between the coils (L1, L2) of the motor 5 and the controller 33, and the first switching element (Q1) and the second switching element (Q2) can be a metal-oxide-semiconductor field-effect transistor, respectively. The drain electrode (D) of the first switching element (Q1) is electrically connected with the second end of the coil (L1) of the motor 5, and the drain electrode (D) of the second switching element (Q2) is electrically connected with the second end of the coil (L2) of the motor 5. The first end of the coil (L1) and the first end of the coil (L2) are electrically connected with the output terminal of the converting circuit 31. The gate electrode (G) of the first switching element (Q1) is electrically connected with the first pin (Out 1) of the controller 33 (driving IC), and the gate electrode (G) of the second switching element (Q2) is electrically connected with the second pin (Out 2) of the controller 33 (driving IC). The source electrode (S) of the first switching element (Q1) and the source electrode (S) of the second switching element (Q2) are electrically connected with the ground.

Figure 6:
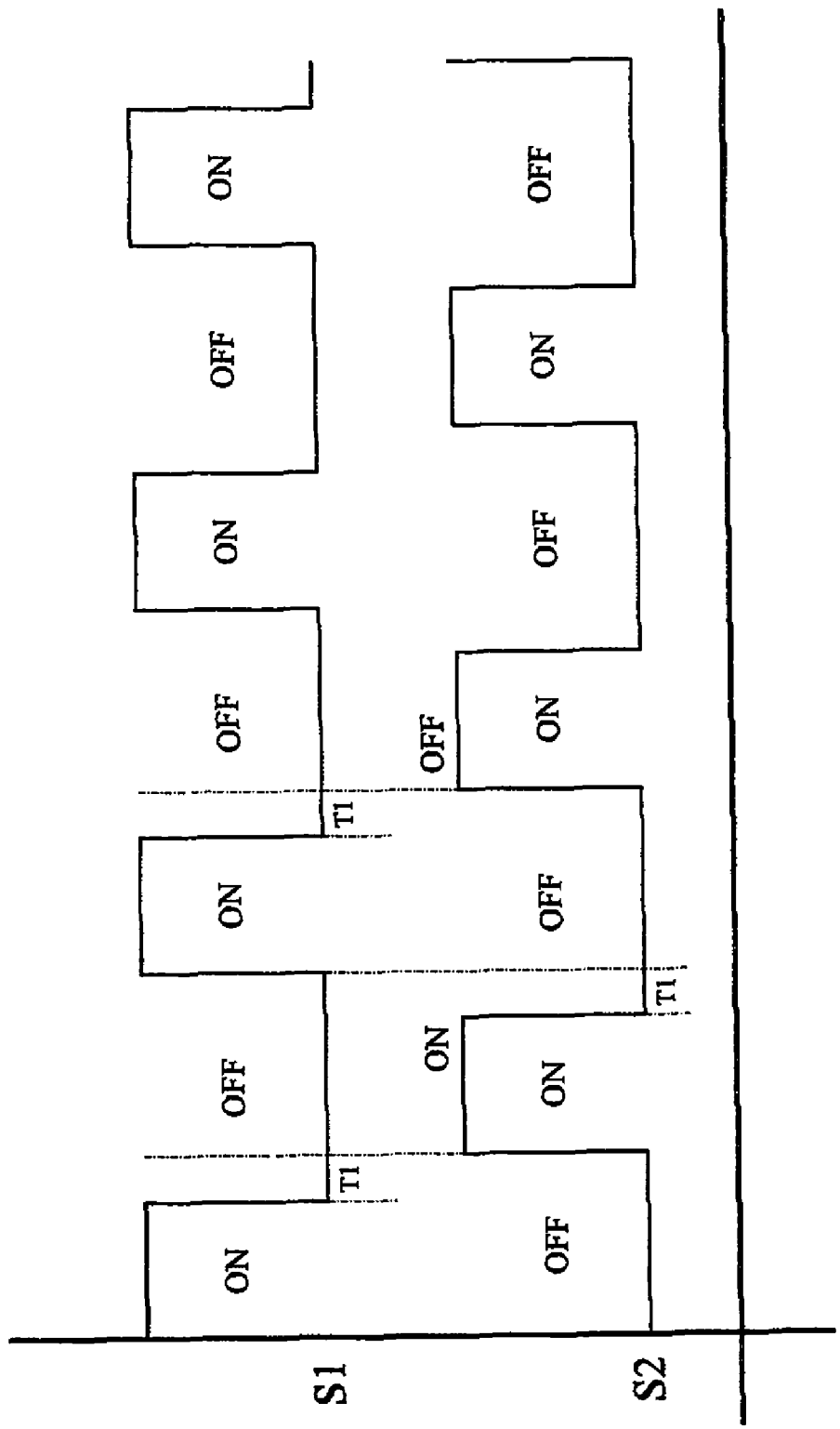
FIG. 6 is a schematic diagram showing the wave of a first driving signal and a second driving signal of the motor control device according to the first embodiment of the present invention.

Please refer to FIG. 4, the detecting unit 331 of the controller 33 detects the magnetic poles of the motor 5 when the motor 5 operates, so as to generate the magnetic pole detecting signal (Sp). The signal controlling unit 332 receives the magnetic pole detecting signal (Sp) and generates the first driving signal (S1) and the second driving signal (S2) according to the magnetic pole detecting signal (Sp), then, the signal controlling unit 332 outputs the first driving signal (S1) to the first switching element (Q1) of the driving circuit 34 and outputs the second driving signal (S2) to the second switching element (Q2) of the driving circuit 34 respectively. When the first driving signal (S1) received by the first switching element (Q1) is at high potential (the second driving signal (S2) is at low potential at this moment), the first switching element (Q1) is electrified by the first driving signal (S1) of high potential, and then the fourth switching element (Q4) is also electrified, so that the current (I) of the alternating current power source 4 passes through the fourth switching element (Q4), the coil (L) of the motor 5, the first switching element (Q1) and the ground. Please refer to FIG. 6 at the same time, the signal controlling unit 332 converts the first driving signal (S1) to be at low potential the default value of time (T) (6-8 μSec for example) before the signal controlling unit 332 converts the second driving signal (S2) to be at high potential, so as to switch off the first switching element (Q1) ahead of time. Thus, after the second driving signal (S2) is converted to be at high potential and passes through the second switching element (Q2), the second driving signal (S2) electrifies the second switching element (Q2) and the third switching element (Q3), so that the current (I) of the alternating current power source 4 passes through the third switching element (Q3), the coil (L) of the motor 5, the second switching element (Q2) and the ground. The signal controlling unit 332 converts the second driving signal (S2) to be at low potential the default value of time (T) before the signal controlling unit 332 converts the first driving signal (S1) to be at high potential, so as to switch off the second switching element (Q2) ahead of time. Thus, after the first driving signal (S1) is converted to be at high potential and passes through the first switching element (Q1), the first driving signal (S1) electrifies the first switching element (Q1) again. Therefore, the first switching element (Q1) and the second switching element (Q2) are switched on or switched off alternately according to the first driving signal (S1) and the second driving signal (S2) respectively, so as to interchange the direction of the current flowing through the coil (L) of the motor 5 and drive the motor 5 to operate.

By the means described above, the last switching element is switched off before the next switching element is switched on, so that the current (I) of the alternating current power source 4 passes through the coil (L) of the motor 5 smoothly and the two switching elements will not be switched on at the same time, i.e., a short circuit will not be formed and the switching elements will not be burnt down. Furthermore, the driving IC (controller 33) of the motor control device 3 of the present invention controls all the four switching elements (Q1, Q2, Q3, Q4) of the full-bridge circuit (driving circuit 34) by only two pins, and the hall element (detecting unit 331) is built-in the driving IC (controller 33), so that the circuit is simplified and the cost is reduced.

Figure 7:
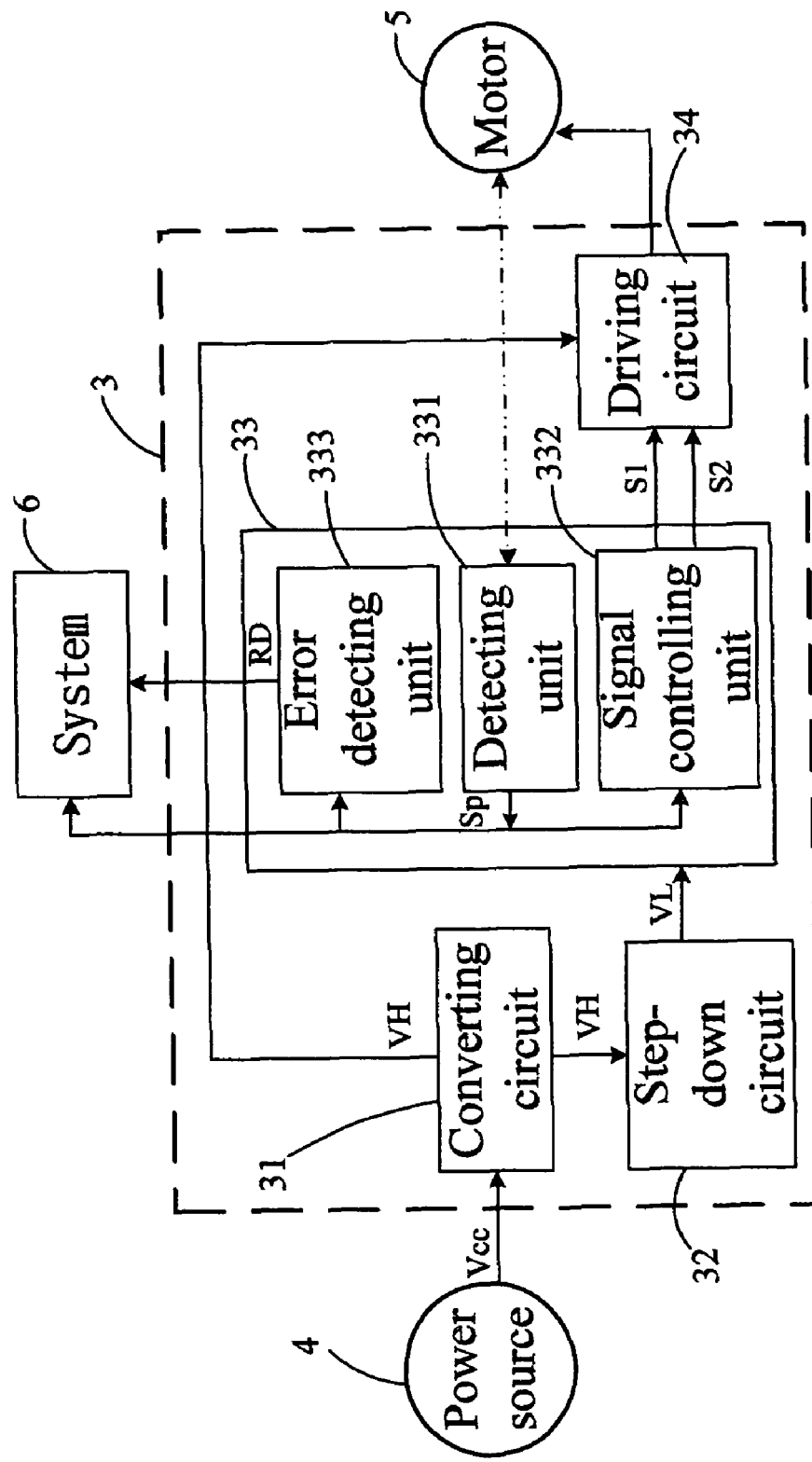
FIG. 7 is a circuit block diagram of a motor control device according to a second embodiment of the present invention.
Figure 8:
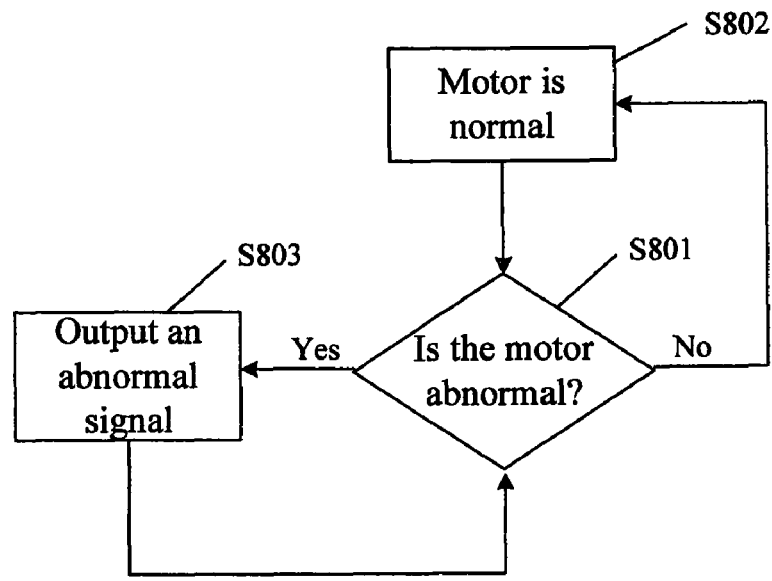
FIG. 8 is a process flow chart when the motor control device according to the second embodiment of the present invention is abnormal.
Figure 9:
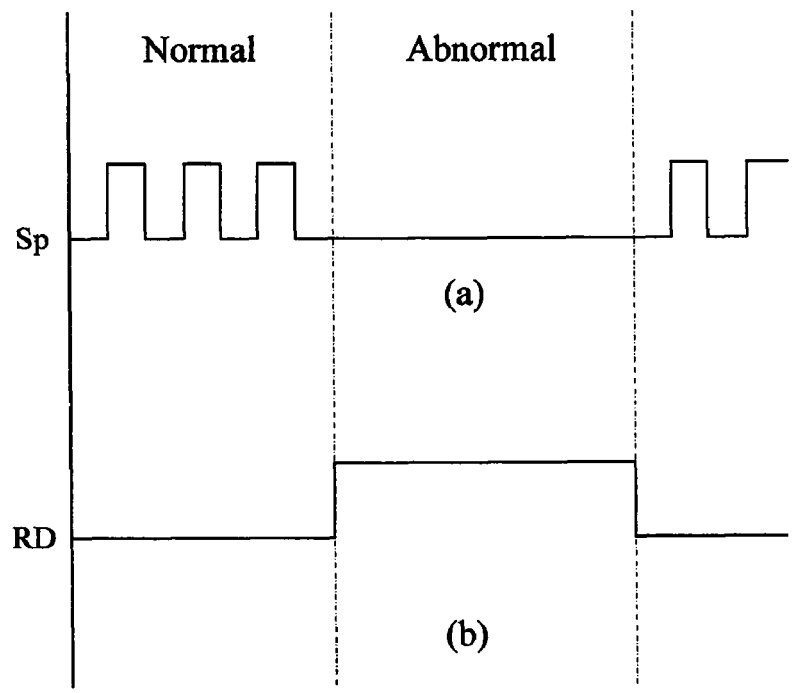
FIG. 9 is a schematic diagram showing the wave of a magnetic pole detecting signal (SP) and an abnormal signal (RD) of the motor control device according to the second embodiment of the present invention.

Please refer to FIG. 7, the difference between the first embodiment and the second embodiment of the present invention is that the motor control device 3 according to the second embodiment of the present invention further includes an error detecting unit 333 which is built-in the controller 33. In addition, the controller 33 further includes a fifth pin (F00) (not shown) or/and a sixth pin (R00) (not shown), and the fifth pin and the sixth pin can be electrically connected with an external system 6. The fifth pin outputs the magnetic pole detecting signal (Sp) to the external system 6, so that the external system 6 can figure out the rotational speed of the motor 5. The sixth pin is for giving the alarm. Please refer to FIG. 8 at the same time, in the step S801, the error detecting unit 333 receives the magnetic pole detecting signal (Sp) (as shown in the (a) of FIG. 9) and determines whether the motor 5 is normal or abnormal according to the magnetic pole detecting signal (Sp). When the motor 5 is normal (step S802), the magnetic pole detecting signal (Sp) received by the error detecting unit 333 is a pulse-width modulation signal of alternate high potential and low potential. When the motor 5 is abnormal, the magnetic pole detecting signal (Sp) received by the error detecting unit 333 is a serial pulse-width modulation signal of high potential or a serial pulse-width modulation signal of low potential (the magnetic pole detecting signal (Sp) received by the error detecting unit 333 is a serial pulse-width modulation signal of low potential shown in FIG. 3, and the pulse-width modulation signal (Sp) of alternate high potential and low potential represents the alternating magnetic poles of the motor 5, so it represents that the magnetic poles of the motor 5 are not alternating when the magnetic pole detecting signal (Sp) received by the error detecting unit 333 is a serial pulse-width modulation signal of high potential or a serial pulse-width modulation signal of low potential, i.e., the motor 5 is abnormal). When the error detecting unit 333 determines the motor 5 is abnormal, the error detecting unit 333 converts an abnormal signal (RD) of low potential to be an abnormal signal (RD) of high potential (as shown in the (b) of FIG. 9) and outputs the abnormal signal (RD) of high potential to the external system 6 (step S803) through the sixth pin (R00) of the controller 33, so as to inform the external system 6 that the motor 5 is abnormal.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor control device, being electrically connected with a motor, the motor control device comprising:

a controller comprising a default value of time, wherein the controller detects the magnetic poles of the motor when the motor operates, so as to generate a magnetic pole detecting signal and output a first driving signal and a second driving signal; and a driving circuit electrically connected with the motor and the controller respectively, the driving circuit comprising a first switching element and a second switching element, the first switching element being for receiving the first driving signal, the second switching element being for receiving the second driving signal, and the first switching element and the second switching element being switched on or being switched off alternately according to the first driving signal and the second driving signal respectively, so as to interchange a direction of a current flowing through a coil of the motor and drive the motor to operate;

wherein the controller switches off the first switching element by the first driving signal the default value of time before the controller switches on the second switching element by the second driving signal, and the controller switches off the second switching element by the second driving signal the default value of time before the controller switches on the first switching element by the first driving signal; and wherein the controller further comprises an error detecting unit for receiving the magnetic pole detecting signal, and the error detecting unit determines the motor is normal when the magnetic pole detecting signal is a pulse-width modulation signal of alternate high potential and low potential, and the error detecting unit determines the motor is abnormal when the magnetic pole detecting signal is a serial pulse-width modulation signal of high potential or a serial pulse-width modulation signal of low potential.

2. The motor control device according to claim 1, further comprising:

a converting circuit electrically connected with the driving circuit and an alternating current power source, respectively, the converting circuit being for converting a voltage of the alternating current power source to be a voltage of direct current and outputting the voltage of direct current; and a step-down circuit electrically connected with the converting circuit and the controller, respectively, step-down circuit being for stepping down the voltage of direct current outputted by the converting circuit and outputting the stepped down voltage of direct current to the controller.

3. The motor control device according to claim 1, wherein the controller further comprises:

a detecting unit for detecting the magnetic poles of the motor when the motor operates and generating the magnetic pole detecting signal; and a signal controlling unit comprising the default value of time, and the signal controlling unit being for receiving the magnetic pole detecting signal and generating the first driving signal and the second driving signal.

4. The motor control device according to claim 1, wherein the error detecting unit outputs a serial abnormal signal of high potential or a serial abnormal signal of low potential to a system when the error detecting unit determines the motor is abnormal.

5. The motor control device according to claim 1, wherein the driving circuit is a full-bridge circuit comprising a lower bridge composed of the first switching element and the second switching element, and an upper bridge composed of a third switching element and a fourth switching element, and the said switching elements are electrically connected between the coil of the motor and the controller, wherein the third switching element and the fourth switching element are a bipolar junction transistor respectively, and the first switching element and the second switching element are a metal-oxide-semiconductor field-effect transistor respectively, a collect of each of the bipolar junction transistors are electrically connected with the coil respectively, a base of each of the bipolar junction transistors and an emitter of each of the bipolar junction transistors are electrically connected with a converting circuit, a drain electrode of each of the metal-oxide-semiconductor field-effect transistor is electrically connected with two ends of the coil and the base of the bipolar junction transistors respectively, a gate electrode of each of the metal-oxide-semiconductor field-effect transistor are electrically connected with the controller respectively, and a source electrode of each of the metal-oxide-semiconductor field-effect transistor are electrically connected with a ground.

6. The motor control device according to claim 1, wherein the driving circuit is a half-bridge circuit comprising the first switching element and the second switching element, the first switching element and the second switching element are electrically connected between a first coil of the motor, a second coil of the motor and the controller, the first switching element and the second switching element are a metal-oxide-semiconductor field-effect transistor respectively, and a drain electrode of each of the metal-oxide-semiconductor field-effect transistor are electrically connected with the first coil and the second coil, a gate electrode of each of the metal-oxide-semiconductor field-effect transistor are electrically connected with the controller respectively, and a source electrode of each of the metal-oxide-semiconductor field-effect transistor is electrically connected with a ground.

7. The motor control device according to claim 1, wherein both the first driving signal and the second driving signal are a pulse-width modulation signal of alternate high potential and low potential, and the first driving signal and the second driving signal does not be at high potential at the same time, the first switching element is switched on when the first driving signal received by the first switching element is at high potential, and the first switching element is switched off when the first driving signal received by the first switching element is at low potential, the second switching element is switched on when the second driving signal received by the second switching element is at high potential, and the second switching element is switched off when the second driving signal received by the second switching element is at low potential.

8. The motor control device according to claim 7, wherein the controller converts the first driving signal to be at low potential the default value of time before the second switching element is switched on by the second driving signal of high potential, so as to switch off the first switching element ahead of time; and the controller converts the second driving signal to be at low potential the default value of time before the first switching element is switched on by the first driving signal of high potential, so as to switch off the second switching element ahead of time.

9. A controller, which is electrically connected with a driving circuit of a motor control device, and the driving circuit is electrically connected with a motor, the controller comprising:

a detecting unit for detecting magnetic poles of the motor when the motor operates and generating a magnetic pole detecting signal; and a signal controlling unit comprising a default value of time, the signal controlling unit receives the magnetic pole detecting signal, so as to generate a first driving signal and a second driving signal according to the magnetic pole detecting signal and output the first driving signal and the second driving signal to the driving circuit;

wherein a first switching element and a second switching element of the driving circuit being switched on or being switched off alternately according to the first driving signal and the second driving signal respectively, so as to interchange a direction of a current flowing through a coil of the motor and drive the motor to operate; and the signal controlling unit switches off the first switching element by the first driving signal the default value of time before the signal controlling unit switches on the second switching element by the second driving signal, and the signal controlling unit switches off the second switching element by the second first driving signal the default value of time before the signal controlling unit switches on the first switching element by the first driving signal; and further comprising an error detecting unit for receiving the magnetic pole detecting signal, and the error detecting unit determines the motor is normal when the magnetic pole detecting signal is a pulse-width modulation signal of alternate high potential and low potential, and the error detecting unit determines the motor is abnormal when the magnetic pole detecting signal is a serial pulse-width modulation signal of high potential or a serial pulse-width modulation signal of low potential.

10. The controller according to claim 9, wherein the detecting unit is a hall element, and the controller is a driving IC.

11. The controller according to claim 9, wherein the driving IC comprises a first pin, a second pin, a third pin and a fourth pin, the first pin being for outputting the first driving signal, the second pin being for outputting the second driving signal, the third pin is electrically connected with a power source, and the fourth pin is electrically connected with a ground.

12. The controller according to claim 11, wherein the driving IC further comprises a fifth pin and a sixth pin, the fifth pin and the sixth pin are electrically connected with an external system, and the fifth pin being for outputting the magnetic pole detecting signal to the external system, the sixth pin being for outputting an abnormal signal of serial high potential or an abnormal signal of serial low potential to the external system when the motor is abnormal.

13. The controller according to claim 9 wherein the error detecting unit outputs an abnormal signal of serial high potential or an abnormal signal of serial low potential to an external system through a sixth pin of the controller, so as to inform the external system that the motor is abnormal.

* * * * *